US005859436A

United States Patent [19]
Harada et al.

[11] Patent Number: 5,859,436
[45] Date of Patent: Jan. 12, 1999

[54] METHOD FOR DETERMINING PHOTONUCLEAR REACTION CROSS SECTION AND TRANSFORMING ATOMIC NUCLEUS

[75] Inventors: Hideo Harada, Ibaraki; Isamu Sato, Tuchiura, both of Japan

[73] Assignee: Doryokuro Kakunenryo Kaithatsu Jigyodan, Tokyo, Japan

[21] Appl. No.: 912,752

[22] Filed: Aug. 18, 1997

Related U.S. Application Data

[62] Division of Ser. No. 589,607, Jan. 22, 1996, Pat. No. 5,712,484.

[30] Foreign Application Priority Data

Apr. 21, 1995 [JP] Japan ................................ 7-96532

[51] Int. Cl.[6] ................................ G01T 1/34; G01T 1/36
[52] U.S. Cl. ..................... 250/370.01; 250/371; 250/395
[58] Field of Search ..................... 250/370.01, 370.15, 250/371, 393, 395; 376/153, 156, 157

[56] References Cited

U.S. PATENT DOCUMENTS

| | | | |
|---|---|---|---|
| 3,404,274 | 10/1968 | Mittelman et al. | 250/371 |
| 3,496,360 | 2/1970 | Dewan . | |
| 3,633,030 | 1/1972 | Antkiw et al. . | |
| 4,315,417 | 2/1982 | Zarodiansky . | |
| 5,712,484 | 1/1998 | Harada et al. | 250/370.15 |

FOREIGN PATENT DOCUMENTS 1-51158  11/1989  Japan .

OTHER PUBLICATIONS

Veres, "Gamma Activation of Nuclear Isomers and Its Applications", Atomic Energy Review, vol. 18, No. 2, Jun. 1980, pp. 271–328.

C. Michel, et al., "Monte Carlo Simulation of Complex Germanium Detector Systems and Compton Suppression Spectrometers," Nuclear Instruments and Methods in Physics Research, 1986, A251: 119–133.

Glen F. Knoll, "Radiation Detection and Measurement", Second Edition, John Wiley & Sons, Inc., 1989, pp. 387–443.

*Primary Examiner*—Edward J. Glick
*Attorney, Agent, or Firm*—Fish & Richardson, P.C.

[57] ABSTRACT

A germanium detector measures an energy spectrum of a gamma ray flux. The detector includes a cooling layer continuous over a periphery of the columnar germanium crystal. The cooling layer reduces current leakage induced by heat, so that high energy gamma rays can be precisely detected. A combination of a plurality of germanium crystal bodies connected one another to form the germanium crystal of at least 20 cm leads to a more precise detection of high energy gamma rays. A method for determining a photonuclear reaction cross section using the germanium detector enables measurement of the energy dependence of a photonuclear reaction cross section at high resolution. The method employs a white gamma ray flux radiated to a nuclide. The germanium detector measures the spectrum of a transmission gamma ray flux transmitted through the nuclide. Peaks are specified in the obtained spectrum. An atomic nucleus can be transformed using a monochromatic gamma ray flux having an energy level corresponding to the peak.

6 Claims, 6 Drawing Sheets

METHOD FOR DETERMINING PHOTONUCLEAR REACTION CROSS SECTION AND TRANSFORMING ATOMIC NUCLEUS

This is a divisional of application Ser. No. 08/589,607 filed Jan. 22, 1996, now U.S. Pat. No. 5,712,484.

BACKGROUND OF THE INVENTION

The present invention relates to a germanium detector for measuring an energy spectrum of a gamma ray flux, and to a method for measuring a photonuclear reaction cross section using such germanium detector. The invention also relates to a method for determining a peak value of a photonuclear reaction cross section by using the same method in transforming an atomic nucleus.

Dealing with a high level radioactive waste from an operating nuclear reactor is a serious problem. One general method is the entombment of high level radioactive waste in a vitrified or asphaltified mass. The mass is kept until the radioactive waste decays to eliminate the radioactivity. This type of method can deal with radioactive waste including cesium 137 and strontium 90 of a relatively long half-life. However, the mass should be maintained somewhere over a long period of time. It is very difficult to find and maintain a site for storing the mass. Accordingly, other than the natural decay of radioactive waste, a treatment is sought for promoting the decay of a radioactive waste.

One proposed treatment comprises neutron irradiation in which radioactive waste is irradiated with neutrons. This treatment utilizes (n, γ) reaction or/and (n, 2n) reaction triggered by neutrons. Such a reaction serves to transform a nuclide to be dealt with into a short half-life or stable nuclide. However, an apparatus has not yet been developed for generating the high density neutron flux required for such a reaction. Therefore, the ability to provide such treatment is still doubtful until a practical nuclear fusion reactor can be produced in the future. Thus treatment without a neutron flux should be considered at the present time.

Figure 1:
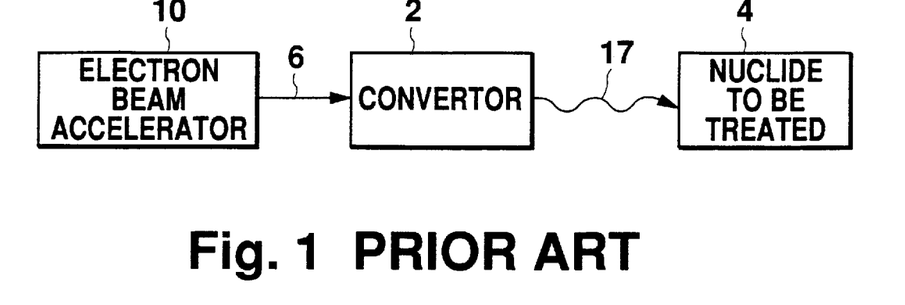
FIG. 1 illustrates a block diagram of a prior art apparatus employed in dealing with a radioactive waste.

For example, Japanese Patent Publication (kokoku) No. Hei 1-51158 (1989) discloses a treatment which meets the above requirement. The disclosed treatment uses a white gamma ray flux in the energy range of 10 MeV–25 MeV with which a radioactive waste containing subject nuclides is irradiated. The irradiation serves to trigger photonuclear reaction such as (γ, n) reaction so as to promote the transformation of the subject nuclides. FIG. 1 shows that an electron beam 6 is generated in an electron accelerator 10 in this treatment. A convertor 2 converts the electron beam 6 to gamma rays 17, with which a subject nuclide 4 is irradiated. The irradiation transforms the subject nuclide 4.

The treatment was established in accordance with the following phenomenon. Generally, the irradiation of a subject nuclide with gamma rays of at least 7 MeV–8 MeV enables photonuclear reaction. When the energy of the gamma rays reaches 10 MeV–25 MeV, the subject nuclides abruptly come to absorb the gamma rays quickly, so that a resonance phenomenon of several hundreds millibarns takes place in this energy range, which is called "giant resonance reaction (absorption)". The photonuclear reaction is frequently generated in the giant resonance reaction. This promotes the transformation of the subject nuclides, for example, from cesium 137 to cesium 136. Cesium 137 decays with the emission of a beta particle by the radioactive half-life of 30 years, while cesium 136 decays by the radioactive half-life of 13 days to be barium 136, a stable nuclide. This is the summary of the treatment.

However, the short half-life of 13 days is ideally achieved only when all nuclei of cesium 137 are transformed to those of cesium 136. Therefore, the average half-life is actually longer than 13 days (but shorter than 30 years).

The prior art treatment will be further described in detail using the concept of a photonuclear reaction cross section (unit: "barn"). A photonuclear reaction cross section is nearly proportional to a probability of the occurrence of photonuclear reaction.

In the prior art treatment utilizing photonuclear reaction, radioactive waste is irradiated with a white gamma ray flux including an energy level which has a maximum photonuclear reaction cross section (referred to as an "optimum energy level" hereinafter). It is definitely preferable to use a monochromatic gamma ray flux concentrated at an optimum energy level in place of a white gamma ray flux, which includes a broad band of energy level. The monochromatic gamma ray flux enables photonuclear reaction to take place more efficiently. However, monochromatic gamma rays have not been used in the prior art treatment because a photonuclear reaction cross section cannot be measured accurately enough.

Figure 2:
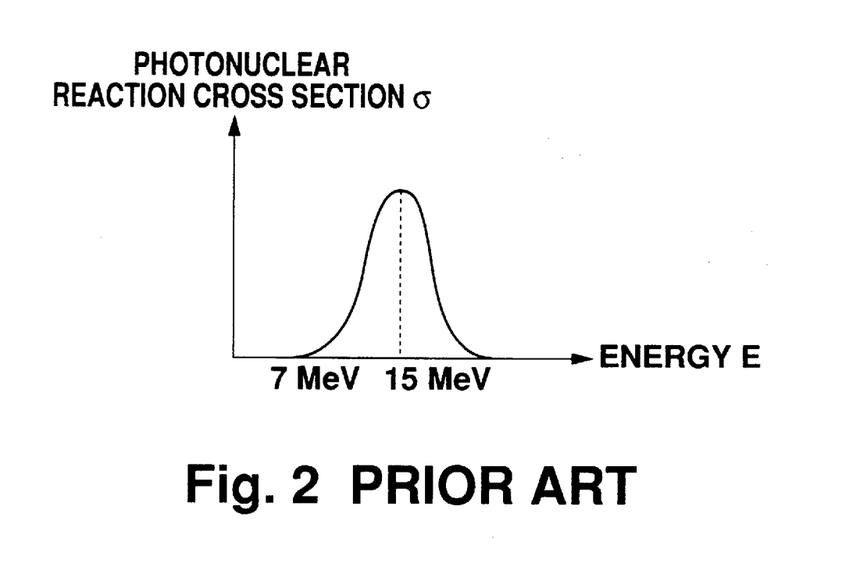
FIG. 2 shows a distribution of a photonuclear reaction cross section of cesium, which were measured by a neutron detector in a prior art determining method.

In a prior art method for measuring a photonuclear reaction cross section, a subject nuclide is irradiated with a monochromatic gamma ray flux, thereby triggering photonuclear reaction in the nuclide. The number of neutrons generated by the photonuclear reaction is then counted using a neutron detector. Varying the energy level of the applied monochromatic gamma rays reveals the photonuclear reaction cross section of the subject nuclide at the varied energy levels. The prior art method provides, as shown in FIG. 2, an energy spectrum of photonuclear reaction cross section of cesium, which indicates the optimum energy level around 15 MeV. The prior art method depends on the accuracy of energy level in generating a monochromatic gamma ray flux, resulting in a 3% resolution of measurement of a photonuclear reaction cross section.

The 3% resolution of measurement provides a question whether or not an energy spectrum in FIG. 2 obtained from a neutron detector reflects a precise photonuclear reaction cross section. Actually, it is possibly suggested so far that some nuclides have a peak for a photonuclear reaction cross section at a specific energy level. If a photonuclear reaction cross section is supposed to have a keen peak at a certain energy level, so that a slight deviation from the peak causes a drastic decrease in the photonuclear reaction cross section, it is not desirable to determine a photonuclear reaction cross section using the spectrum shown in FIG. 2. Further, the generation of a monochromatic gamma ray flux, for instance, by the collision of an electron and a positive electron, costs much more as compared with that of a white gamma ray flux. The practical utilization of a monochromatic gamma ray flux may therefore fail to cover the investment, because it is uncertain how much probability can be achieved to trigger photonuclear reaction with a monochromatic gamma ray flux having an energy level supposed to be an optimum energy level.

Moreover, an energy spectrum in FIG. 2 of a photonuclear reaction cross section allows some modification due to a 3% resolution of measurement by moderating up-and-downs in the spectrum of the photonuclear reaction cross section. The spectrum thereby is expressed by a smooth curve. The maximum value observed in FIG. 2 may be plotted much smaller than the actual value.

The calculation is made to reveal the amount of energy that is consumed in a prior art treatment. For this purpose the energy required to transform the nuclide of cesium 137 in a prior art treatment is compared with the energy required to generate cesium 137. In a prior art treatment, a photonuclear reaction $(\gamma, n)$ causes an electron pair creating reaction in the competitive process. It is known that the photonuclear reaction cross section $\sigma 1$ of cesium in FIG. 2 is equal to 0.32 barn at 15 MeV whereas the reaction cross section $\sigma 2$ of an electron pair creating reaction is approximately equal to 9 barns. Suppose that the ratio $\sigma 1:\sigma 2$ can be approximated to 1:29. This means that one photon of gamma rays of 15 MeV is spent to generate a photonuclear reaction while 29 photons are consumed to create electron pairs. The total energy of 450 MeV corresponding to 30 photons of the gamma rays causes a photonuclear reaction so as to transform a nuclide of cesium 137. The total energy is merely estimated when a monochromatic gamma ray flux is radiated at the optimum energy level. The Monte Carlo Simulation reveals that a total energy of approximately 3000 MeV is required for a white gamma ray flux in the prior art treatment. It is well known that 0.06 nucleus of cesium 137 is formed at one fission which consumes approximately 200 MeV. In other words, a heat energy of approximately 3000 MeV (=200 MeV/0.06) can be obtained for every generation of a cesium 137 nucleus. The heat energy can be converted to electricity at an efficiency of $\frac{1}{3}$. The final energy thus obtained from the generation of a cesium 137 is estimated to be approximately 1000 MeV. Accordingly, the prior art treatment of cesium 137 cannot stand against a cost performance requirement because the energy of 3000 MeV is required to eliminate a nucleus of cesium 137 which provides only the energy of 1000 MeV.

SUMMARY OF THE INVENTION

It is a first object of the present invention to provide a germanium detector capable of measuring a gamma ray spectrum at a high resolution and a high detecting efficiency.

In order to achieve the first object, a first aspect of the present invention provides a germanium detector capable of measuring a gamma ray spectrum approximately up to 20 MeV energy level.

Figure 3:
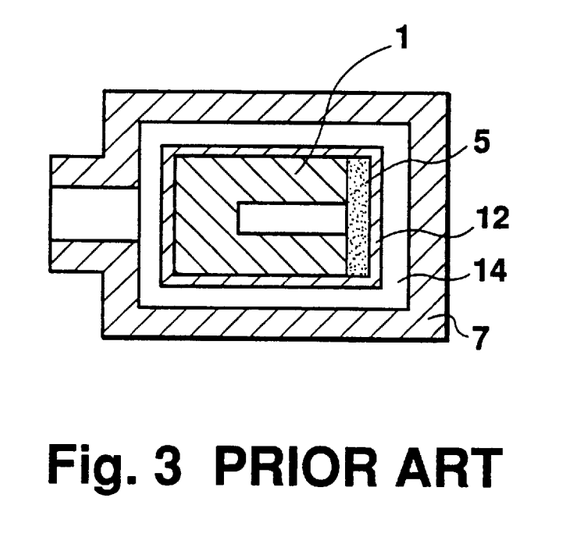
FIG. 3 illustrates a prior art germanium detector.

A prior art germanium detector is actually not applicable to the measurement of gamma rays in the energy range over 1 MeV. The restriction is caused by a restricted growth length of a germanium crystal used in a primary detecting section and a thickness of a BGO scintillator surrounding the primary detecting section. A prior art germanium detector is disclosed in "Radiation Detection and Measurement Second Edition" by Glenn F. Knoll. The disclosed germanium detector includes a germanium crystal 1, as shown in FIG. 3, for detecting gamma rays. The germanium crystal 1 is provided at its bottom with a cooling layer 5 of copper for reduce current leakage induced by heat. The cooling layer 5 is normally cooled with liquid nitrogen. The germanium crystal 1 and cooling layer 5 are both sealed in a thin aluminum layer 12, which is contained in a BGO scintillator 7 defining a vacuum layer 14 between the aluminum layer 12 and the scintillator 7. The BGO scintillator 7 detects photons escaping from the germanium crystal 1, thereby excluding from the detected events an event which fails to show a full energy peak by the anti-coincidence. The aluminum layer 12 and vacuum layer 14 serve to improve the cooling efficiency.

The length of the germanium crystal 1 is limited up to about 10 cm proportional to a restricted crystal growth of germanium. The prior art germanium detector enables the measurement of a gamma ray spectrum at a 0.1% resolution, however, the restriction of the length causes a reduction in a detecting property for gamma rays over 1 MeV, such as a detecting efficiency, a full peak/non-full peak ratio serving as an S/N ratio, and the like. This leads to a difficulty in providing a precise measurement. Further, the energy of gamma rays to be detected is about 1 MeV so that the thickness of the BGO scintillator 7 is at most 2 cm.

"Monte Carlo Simulation of Complex Germanium Detector Systems and Compton Suppression Spectrometers", Nuclear Instruments and Methods in Physics Research, A251 (1986) pp 119–133, discloses a germanium detector including a plurality of germanium crystals coupled with one another. However, the document fails to teach a detection of gamma rays around 15 MeV used for determining a photonuclear reaction cross section.

A germanium detector according to the first aspect of the present invention comprises a continuous cooling layer covering a periphery of a columnar germanium crystal. The cooling layer reduces a current leakage induced by heat so that gamma rays of high energy can be reliably and precisely detected. If the germanium crystal comprises a plurality of germanium crystal bodies connected to one another in a length of 20 cm or more, gamma rays of high energy can be more accurately detected.

If the germanium detector is provided with a secondary detecting section covering the cooling layer for detecting photons escaping from the germanium crystal, it is possible to improve a detecting accuracy by the anticoincidence. A BGO scintillator is preferably used for the secondary detecting section. The BGO scintillator of a thickness of at least 4 cm enables improvement of the detecting S/N ratio.

It is a second object of the present invention to provide a method for determining a photonuclear reaction cross section, the method capable of precisely measuring the energy dependency of a photonuclear reaction cross section using a germanium detector. The determining method provides a white gamma ray flux radiated to a subject nuclide. The gamma ray flux transmitted through the subject nuclide is measured to determine an energy distribution or spectrum.

In order to achieve the second object, a second aspect of the present invention provides a method for determining a photonuclear reaction cross section by measuring the photonuclear reaction cross section of an atomic nucleus. This method comprises: irradiating an atomic nucleus with a white gamma ray flux; measuring an intensity distribution of a transmission gamma ray flux transmitted through the atomic nucleus in a predetermined band of energy level; and selecting a peak value of a photonuclear reaction cross section based on the intensity distribution measured. With this method, it is possible to precisely measure a peak value of a photonuclear reaction cross section at a certain energy level.

If the determining method further comprises measuring an intensity distribution of the white gamma ray flux in a predetermined band of energy level and calculating an intensity difference between the white gamma ray flux and the transmission gamma ray flux at a varied energy level based on the intensity distributions measured, it is possible to measure a peak value of a photonuclear reaction cross section in the predetermined band of energy level based on the intensity difference calculated.

It is a third object of the present invention to provide a method for transforming an atomic nucleus, which method is capable of improving transform efficiency of a nuclide by the radiation of a monochromatic gamma ray flux having an optimum energy level. This method enables a precise-calculation of the cost required for the treatment of a radioactive waste.

In order to achieve the third object, a third aspect of the present invention provides a method for transforming an atomic nucleus, the method comprising: setting a monochromatic gamma ray flux at an energy level corresponding to an energy level showing a peak value of a photonuclear reaction cross section; and irradiating an atomic nucleus with the monochromatic gamma ray flux. The method is capable of providing an efficient transformation of a radioactive waste to a stable or short half-life nuclide.

BRIEF DESCRIPTION OF THE DRAWINGS

These and further objects, features and advantages of the present invention will become apparent from the following description of a preferred embodiment in conjunction with the accompanying drawings wherein.

DESCRIPTION OF THE PREFERRED EMBODIMENT

The present invention will now be described in detail by a way of an embodiment referring to the accompanying drawings.

Figure 4:
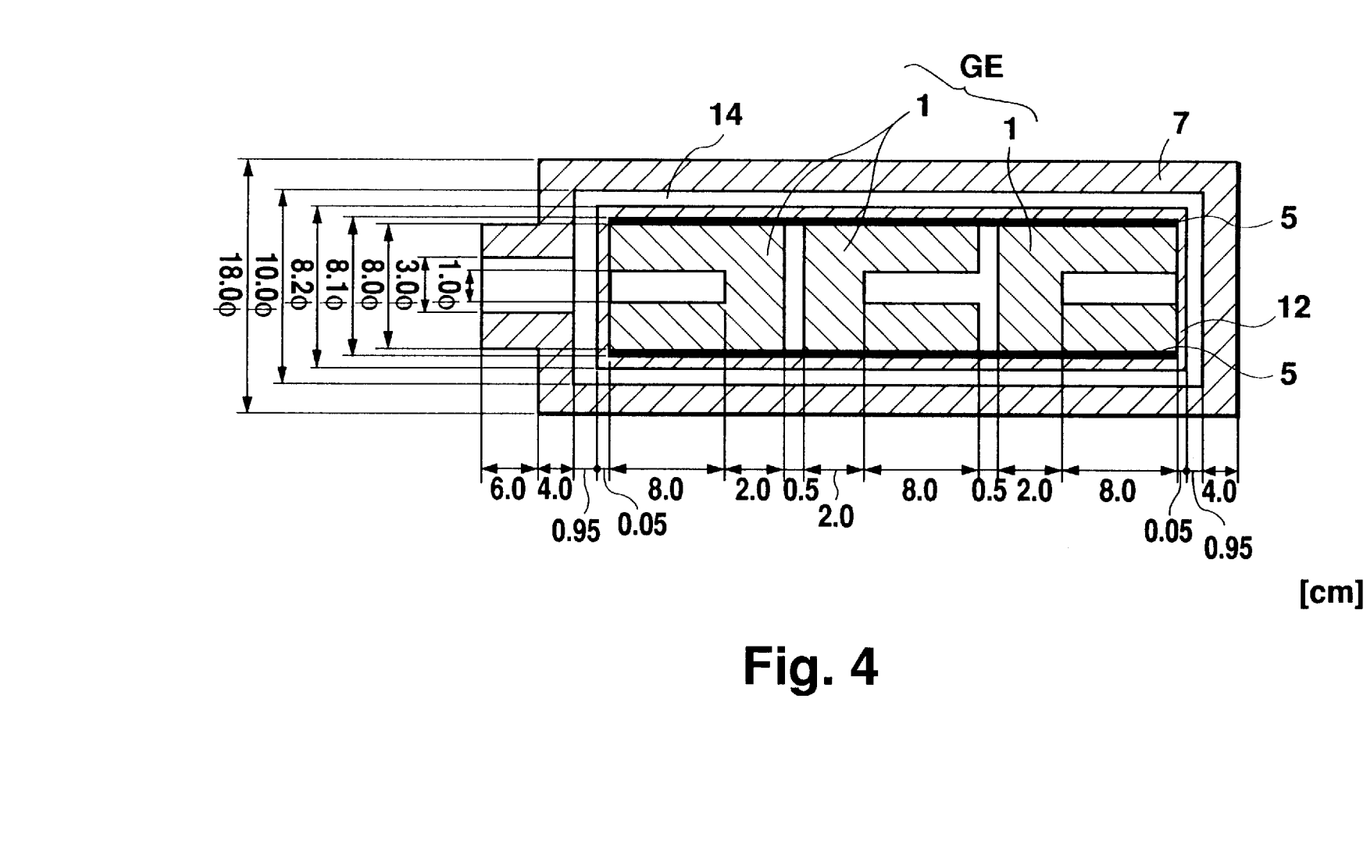
FIG. 4 illustrates a germanium detector of the present invention.

FIG. 4 illustrates a germanium detector according to an embodiment of the present invention. Note that the same reference character as of FIG. 3 is labeled to a corresponding structure shown in FIG. 4.

The germanium detector includes a columnar germanium crystal GE as a primary detecting section extending in the direction of a gamma ray incidence, and an aluminum housing 12 in which the germanium crystal GE is sealed. The germanium crystal GE comprises a plurality of germanium crystal bodies 1 arranged adjacent one another so as to extend at least 20 cm long in the direction of a gamma ray incidence. In this embodiment, three germanium crystal bodies 1 of 10 cm long are connected to one another.

A cooling layer 5 is continuous over a periphery of the columnar germanium crystal GE. The cooling layer 5 is cooled with liquid nitrogen to reduce a current leakage induced by heat. An available unit of a germanium crystal so far provides a cooling layer, as shown in FIG. 3, arranged at the bottom of the germanium crystal. On the contrary, this embodiment provides the cooling layer 5 for continuously covering the periphery of three germanium crystal bodies 1. Such an arrangement can reduce energy absorption by the cooling layer, thereby providing a superior S/N ratio in a detection.

The cooling layer 5 is sealed in the aluminum housing 12 along with the germanium crystal GE. The housing 12 is contained in a BGO scintillator 7 defining a vacuum layer 14 between the housing 12 and the scintillator 7. The BGO scintillator 7 has a thickness of 4 cm in this embodiment.

The prior art germanium detector in FIG. 3 allows a reduction in a detection efficiency and an S/N ratio (which is a peak/non-peak ratio) for gamma rays over 1 MeV. The reduction is inherently caused by a large shower created by electron pair creation, Compton scattering and photoelectric effect upon the application of high energy gamma rays. A germanium detector of 10 cm in the direction of a gamma ray incidence is not long enough to measure an energy spectrum of gamma rays having high energy. The Monte Carlo Simulation in this embodiment has revealed that a germanium crystal GE has to be at least 20 cm long. The Simulation was carried out under the following condition, and the result was considered by the following criterion.

simulation condition:
1. The energy of the incident gamma rays was set at 15 MeV.
2. The incident gamma rays were applied in parallel beams.
3. The germanium detector had a dimension and shape as shown in FIG. 4 (the calculation was made for a single germanium crystal body 1, a doubled crystal body 1 and a tripled crystal body 1, respectively).

criteria considered:
1. A good detection efficiency $\epsilon$ is considered 8% or more.
2. A good S/N ratio (indicated as "$\underline{R}$" hereinafter) is considered 3 or more.

Figure 5:
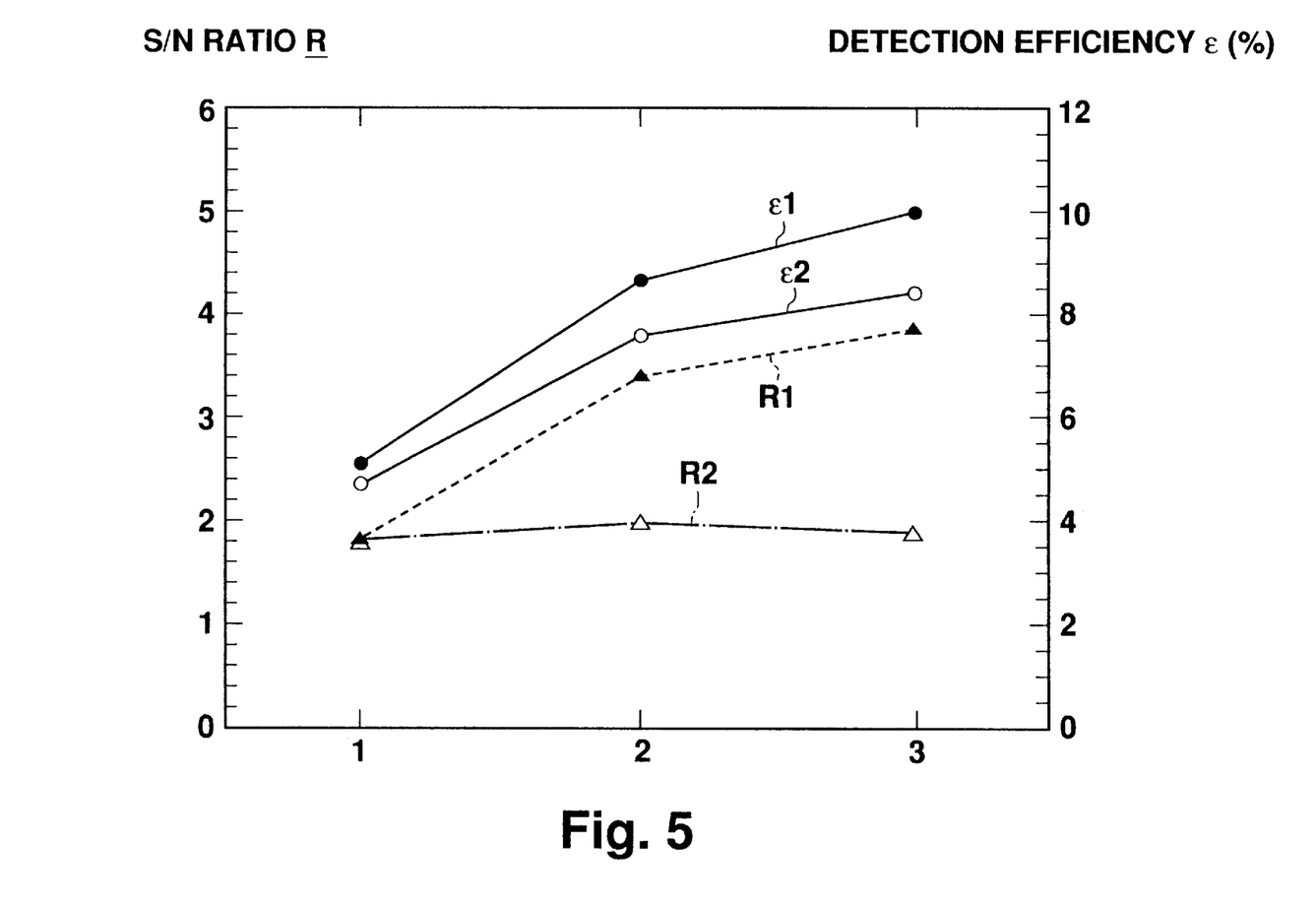
FIG. 5 is a graph showing a detection efficiency $\epsilon$ and an S/N ratio $\underline{R}$ at a varied number of connected germanium crystal bodies.

FIG. 5 shows the detection efficiency and S/N ratio $\underline{R}$ of germanium detectors where one to three of the germanium crystal bodies 1 are used. The indications $\epsilon 1$ and R1 denote the detection efficiency and S/N ratio obtained with a germanium detector of the present invention. The indications $\epsilon 2$ and R2 are also incorporated denoting the detection efficiency and S/N ratio obtained by a prior art germanium detector with a cooling layer arranged at its bottom.

FIG. 5 clearly shows that a combination of three or more germanium crystal bodies 1 allows the detection efficiency $\epsilon 1$ reaching the criteria, and a combination of two or more crystal bodies 1 allows the S/N ratio reaching the criteria. It is to be noted that the BGO scintillator 7 has a thickness of 4 cm in this embodiment. A 2 cm thick scintillator as a prior art can only accomplish the S/N ratio R of the order of 1.5.

Figure 6:
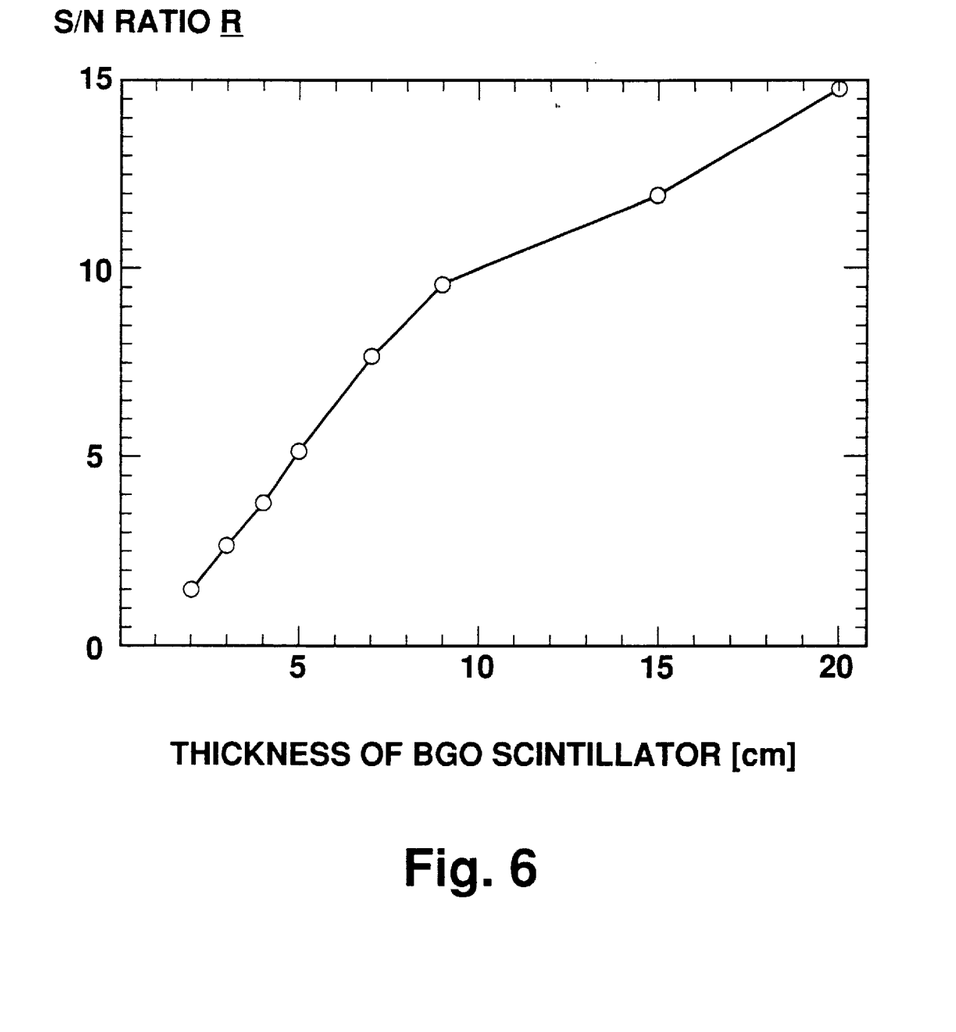
FIG. 6 is a graph showing a relationship between an S/N ratio and the thickness of a BGO scintillator.

FIG. 6 shows a relationship between the thickness of the BGO scintillator 7 and the S/N ratio $\underline{R}$. The Simulation was carried out based on a combination of two germanium crystal bodies 1. FIG. 6 clearly shows that a 4 cm thick BGO scintillator 7 allows the S/N ratio over 3.

Although a germanium crystal body 1 of 10 cm long is employed in this embodiment, a germanium crystal body of 7 cm long is also applicable to the invention. The 7 cm long germanium crystal bodies are arranged adjacent one another so as to extend at least 20 cm in the direction of a gamma ray incidence, while the thickness of the BGO scintillator 7 is set at least 4 cm. This enables high detection efficiency and S/N ratio.

The description will be made of a method for determining a photonuclear reaction cross section by measuring the photonuclear reaction cross section using a germanium detector. The determining method described below enables determination of an energy level which corresponds to a peak of a photonuclear reaction cross section by measuring the photonuclear reaction cross section with a high resolution such as 0.1%.

Figure 7A:
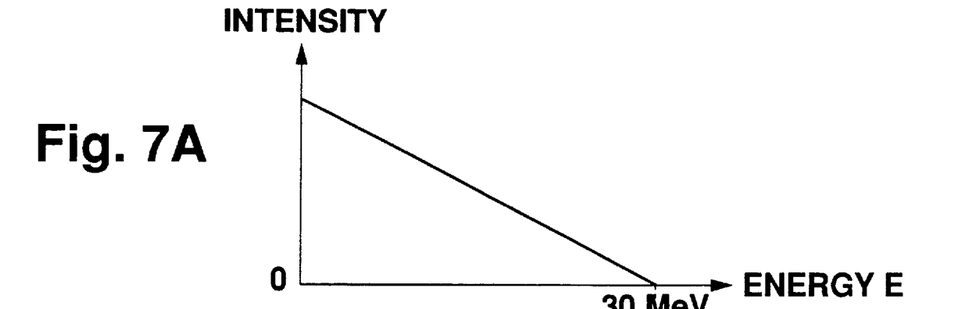
FIGS. 7A to 7C are illustrations for explaining a determining method of the present invention.
Figure 7B:
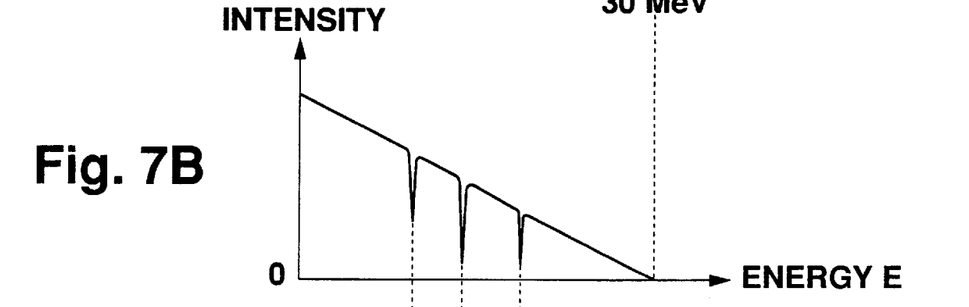
Figure 7C:
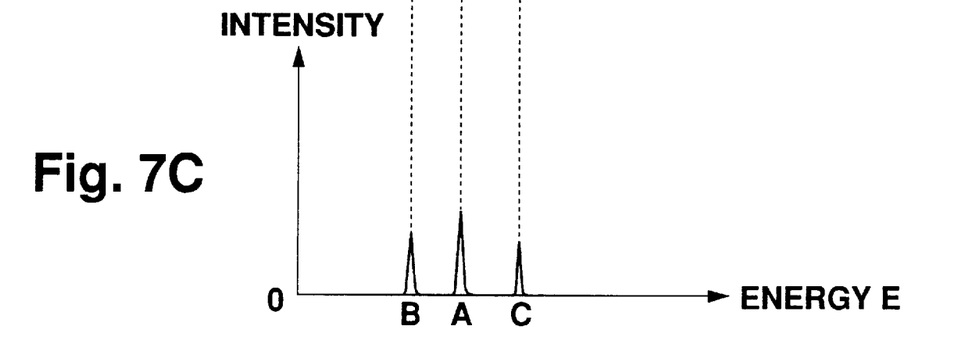

First of all, a subject nuclide is irradiated with a white gamma ray flux. The energy spectrum of the white gamma ray flux is previously measured using the germanium detector of the present invention at a high resolution of 0.1%. Suppose that the measurement reveals an intensity distribution shown in FIG. 7A. The energy spectrum of the transmission gamma ray flux transmitted through the subject nuclide is measured at the same resolution. The measurement of the high resolution allows a sharp notch to appear in the intensity distribution at certain energy levels, as shown in FIG. 7B. The calculation is made on the basis of the obtained intensity distributions so as to find an intensity difference between the white and transmission gamma ray fluxes at a varied energy level. FIG. 7C shows the result in which a plurality of peaks remain in the intensity distribution. The peaks are used to specify energy levels at which a photonuclear reaction cross section of the subject nuclide reaches the peak value.

The subject nuclide remarkably absorbs a component of the radiated white gamma ray flux at an energy level corresponding to a large photonuclear reaction cross section. At this energy level, the spectrum of the transmission gamma ray flux exhibits a sharp notch as shown in FIG. 7B. Excluding the intensity distribution of the transmission gamma ray flux from that of the white gamma ray flux clearly reveals the absorption component. This enables determining the optimum energy level in the photonuclear reaction cross section. The point $\underline{A}$ denotes the optimum energy level in FIG. 7C, while the points $\underline{B}$ and $\underline{C}$ indicate quasi optimum energy levels.

The determining method according to an embodiment of the present invention enables determination of an optimum energy level of a photonuclear reaction cross section based on a new concept in which an atomic nucleus is irradiated with a white gamma ray flux. It is also possible to calculate the value of the photonuclear reaction cross section from the amount of absorbed energy. The determining method is still preferable because the determination of the optimum energy level can be completed by a single comparison within the energy range of the white gamma ray flux thereby leading to an improved measurement efficiency.

Further, the description will be made of a treatment for transforming a subject nuclide to a stable or short half-life nuclide using an optimum energy level obtained from the above-described determining method. The treatment utilizes a method for transforming an atomic nucleus, wherein a subject nuclide is irradiated with a monochromatic gamma ray flux concentrated on the optimum or quasi-optimum energy level. Specifically, the energy level of the monochromatic gamma ray flux is set at an energy level corresponding to a peak of the photonuclear reaction cross section as indicated by the points $\underline{A}$, $\underline{B}$ and $\underline{C}$ in FIG. 7C.

The irradiation of this treatment employs a monochromatic gamma ray flux capable of triggering a photonuclear reaction at a high probability, so that the efficiency of treatment can be improved. If an optimum energy level and the photonuclear reaction cross section at the optimum energy level are accurately measured using the above-described determining method, it is possible to calculate the cost of the treatment. It should be noted that the energy level of a monochromatic gamma ray flux can be set depending on the species of an atomic nucleus to be transformed.

The transforming method described here may be applied to purposes other than a decay treatment of a radioactive waste, such as a transformation of an atomic nucleus, a generation of an isotope and a neutron generation by (γ, n) reaction.

What is claimed is:

1. A method for determining a photonuclear reaction cross section of an atomic nucleus using a germanium detector having a housing, and a copper cooling layer for detecting an energy spectrum of a gamma ray flux, the method comprising:

irradiating the atomic nucleus with a white gamma ray flux;

measuring an intensity distribution of a transmission gamma ray flux transmitted through the atomic nucleus in a predetermined band of energy level; and selecting a peak value of the photonuclear reaction cross section based on the intensity distribution measured.

2. A method as defined in claim 1, further comprising:

measuring an intensity distribution of said white gamma ray flux in a predetermined band of energy level;

calculating an intensity difference between the white gamma ray flux and the transmission gamma ray flux at various energy levels based on the intensity distributions measured; and specifying the peak value of the photonuclear reaction cross section in the predetermined band based on the intensity difference calculated.

3. A method for transforming an atomic nucleus using a method as defined in claim 1, comprising:

setting a monochromatic gamma ray flux at an energy level corresponding to an every level showing a peak value of a photonuclear reaction cross section; and irradiating the atomic nucleus with the monochromatic gamma ray flux.

4. A method for determining a photonuclear reaction cross section of an atomic nucleus, the method comprising:

irradiating the atomic nucleus with a white gamma ray flux;

measuring an intensity distribution of a transmission gamma ray flux transmitted through the atomic nucleus in a predetermined band of energy level; and selecting a peak value of the photonuclear reaction cross section based on the intensity distribution measured.

5. A method as defined in claim 4, further comprising:

measuring an intensity distribution of said white gamma ray flux in a predetermined band of energy level;

calculating an intensity difference between the white gamma ray flux and the transmission gamma ray flux at various energy levels based on the intensity distributions measured; and specifying the peak value of the photonuclear reaction cross section in the predetermined band based on the intensity difference calculated.

6. A method for transforming an atomic nucleus using a method as defined in claim 4, the method comprising:

setting a monochromatic gamma ray flux at an energy level corresponding to an every level showing a peak value of a photonuclear reaction cross section; and irradiating the atomic nucleus with the monochromatic gamma ray flux.

* * * * *